US010199822B2

(12) United States Patent
Shen et al.

(10) Patent No.: US 10,199,822 B2
(45) Date of Patent: Feb. 5, 2019

(54) VOLTAGE BALANCE CONTROL DEVICE AND VOLTAGE BALANCE CONTROL METHOD FOR FLYING-CAPACITOR MULTILEVEL CONVERTER

(71) Applicant: DELTA ELECTRONICS (SHANGHAI) CO., LTD., Shanghai (CN)

(72) Inventors: Guoqiao Shen, Shanghai (CN); Guojin Xu, Shanghai (CN); Jinfa Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 191 days.

(21) Appl. No.: 15/465,100

(22) Filed: Mar. 21, 2017

(65) Prior Publication Data
US 2017/0310105 A1    Oct. 26, 2017

(30) Foreign Application Priority Data

Apr. 22, 2016  (CN) .......................... 2016 1 0256547

(51) Int. Cl.
*H02J 1/14*      (2006.01)
*H02M 7/483*   (2007.01)
(Continued)

(52) U.S. Cl.
CPC ............... *H02J 1/14* (2013.01); *G05B 15/02* (2013.01); *H02M 7/483* (2013.01); *H02M 2001/0025* (2013.01)

(58) Field of Classification Search
CPC .... H02M 1/083; H02M 7/1557; H02M 7/217; H02M 7/525; H02M 7/527; H02M 7/539;
(Continued)

(56) References Cited

U.S. PATENT DOCUMENTS 9,246,407 B2 *   1/2016   Schroeder ............. H02M 7/483
9,431,918 B2 *   8/2016   Zhang ................... H02M 7/217
(Continued)

FOREIGN PATENT DOCUMENTS

| JP | H0197174 A  | 4/1989 |
| WO | 2014042118 A1 | 3/2014 |
| WO | 2015030152 | 3/2015 |

OTHER PUBLICATIONS

Aguilera, Ricardo P., et al., "Capacitator voltage estimation for predictive control algorithm of flying capacitor converters," Industrial Technology, 2009. IEEE International Conference on, IEEE, Piscataway, NJ, USA, Feb. 10, 2009 (Feb. 10, 2009), pp. 1-6, XP031456968, ISBN: 978-1-4244-3506-7.

(Continued)

*Primary Examiner* — Adolf D Berhane
(74) *Attorney, Agent, or Firm* — Kirton McConkie; Evan R. Witt (57) ABSTRACT

A voltage balance control device and a voltage balance control method for a flying-capacitor multilevel converter are provided. A current direction forecasting unit acquires a voltage change amount of any selected flying capacitor of the flying-capacitor multilevel converter, and receives a feedback signal of two adjacent switch elements corresponding to the selected flying capacitor. A computing result is generated according to an average value or a cumulative value of the feedback signal in the adjusting period. After multiplication and/or division is performed on the voltage change amount and the computing result, the current direction can be forecasted according to the obtained sign. Consequently, the voltage balance of the flying capacitor of the flying-capacitor multilevel converter can be achieved.

20 Claims, 7 Drawing Sheets

(51) Int. Cl.
*G05B 15/02* (2006.01)
*H02M 1/00* (2006.01)

(58) Field of Classification Search
CPC ......... H02M 7/483; H02M 2001/0025; H02M 2001/007; H02M 7/49; H02M 7/153; H02M 3/38; H02M 3/46; H02M 3/1582; H02M 3/1584; H02M 3/285; H02J 1/14
See application file for complete search history.

(56) References Cited

U.S. PATENT DOCUMENTS

| | | | | |
|---|---|---|---|---|
| 9,559,611 | B2* | 1/2017 | Zhang | H02M 7/5152 |
| 10,075,056 | B2* | 9/2018 | Zhang | H02M 7/487 |
| 2010/0060256 | A1* | 3/2010 | Ishikawa | G01R 19/10 |
| | | | | 324/76.11 |
| 2016/0141962 | A1* | 5/2016 | Outram | H02M 7/483 |
| | | | | 363/21.01 |
| 2016/0218637 | A1* | 7/2016 | Fan | H02M 7/483 |
| 2016/0336872 | A1* | 11/2016 | Cheng | H02M 7/487 |
| 2017/0338748 | A1* | 11/2017 | Liang | H02M 3/33569 |
| 2018/0006559 | A1* | 1/2018 | Chen | H02M 1/08 |
| 2018/0123447 | A1* | 5/2018 | Shen | H02M 1/32 |

OTHER PUBLICATIONS

Xu, L. et al., "Active capacitor voltage control of flying capacitor multilevel converters," IEE Proceedings: Electric Power Applicati, Institution of Electrical Engineers, GB, vol. 151, No. 3, Feb. 13, 2004 (Feb. 13, 2004), pp. 313-320, XP006021708, ISSN: 1350-2352, DOI: 10. 1049/IP-EPA:20031051.

Hosseini, S. H. et al., "Estimation of flying capacitors voltages in multicell converters," Electrical Engineering/Electronics, Computer, Telecommunications and Information Technology, 2009. Ecti-Con 2009. 6th International Conference on, IEEE, Piscataway, NJ, USA, May 6, 2009 (May 6, 2009), pp. 110-113, XP031480957, ISBN: 978-1-4244-3387-2.

Defay, Francois, et al., "A Predictive Control With Flying Capacitor Balancing of a Multicell Active Power Filter," IEEE Transactions on Industrial Electronics, IEEE Service Center, Piscataway, NJ, USA, vol. 55, No. 9, Sep. 1, 2008 (Sep. 1, 2008), pp. 3212-3220, XP011229798, ISSN: 0278-0046, DOI: 10.1109TIE.2008.927989.

\* cited by examiner

VOLTAGE BALANCE CONTROL DEVICE AND VOLTAGE BALANCE CONTROL METHOD FOR FLYING-CAPACITOR MULTILEVEL CONVERTER

FIELD OF THE INVENTION

The present invention relates to a voltage balance control device and a voltage balance control method, and more particularly to a voltage balance control device and a voltage balance control method for a flying-capacitor multilevel converter.

BACKGROUND OF THE INVENTION

Recently, a multilevel converter is quickly developed and applied to the high-voltage and large-power fields because the multilevel converter is able to obviously reduce the voltage stress of switch elements. Moreover, the benefits of the multilevel converter are obvious when a filtering inductor is operated at a high frequency and a low voltage. Consequently, the volume of the filtering inductor is decreased, and the power loss is reduced. Moreover, the voltage change rate (dv/dt) for the multilevel converter is very low; and the fluctuation of the common mode voltage is low.

The circuitry configurations of the multilevel converter are classified into three types, including a diode-clamped multilevel converter, a cascade multilevel converter and a flying-capacitor multilevel converter. In comparison with the diode-clamped multilevel converter and the cascade multilevel converter, the flying-capacitor multilevel converter has many benefits. For example, the flying-capacitor multilevel converter has simplified circuitry, less amount of components and a lot of redundant switching states. Consequently, the manufactures make efforts in developing the flying-capacitor multilevel converter.

Figure 1:
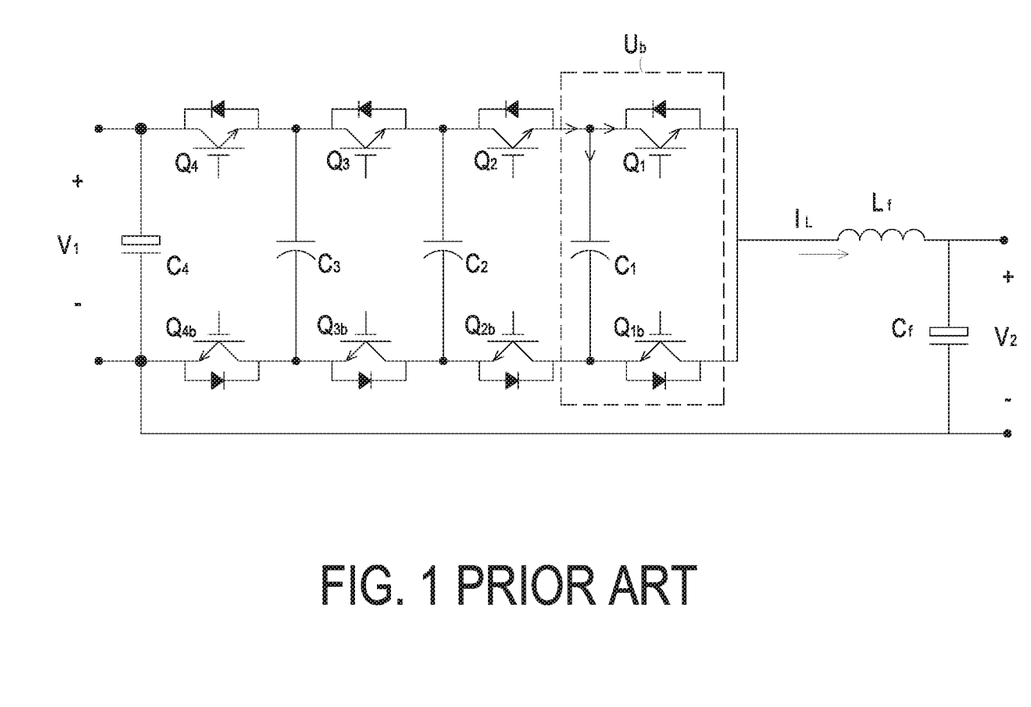
FIG. 1 is a schematic circuit diagram illustrating a conventional flying-capacitor multilevel converter.

As known, it is important to balance the voltages of the flying capacitors of the flying-capacitor multilevel converter. FIG. 1 is a schematic circuit diagram illustrating a conventional flying-capacitor multilevel converter. As shown in FIG. 1, the flying-capacitor multilevel converter comprises plural flying capacitors, even-numbered switch elements and a filtering inductor. The even-numbered switch elements are serially connected between a positive electrode and a negative electrode of a DC voltage source. The filtering inductor is connected with the middle point of the serially-connected even-numbered switch elements. A first end of each flying capacitor is connected with the two adjacent switching elements at a first side of the middle point. A second end of each flying capacitor is connected with the two adjacent switching elements at a second side of the middle point. In other words, the flying-capacitor (p+1)-level converter is composed of p basic units $U_b$ and a filtering inductor. As shown in FIG. 1, the flying-capacitor five-level converter is defined by four basic units $U_b$ and a filtering inductor $L_f$ collaboratively. Each basic unit $U_b$ comprises a flying capacitor and two switching elements. The flying capacitor is connected with the input terminals of the basic unit $U_b$. The two switching elements are connected with the output terminals of the basic unit $U_b$. For example, the first basic unit comprises the flying capacitor $C_1$ and the two switch elements $Q_1$ and $Q_{1b}$, the second basic unit comprises the flying capacitor $C_2$ and the two switch elements $Q_2$ and $Q_{2b}$, a third basic unit comprises the flying capacitor $C_3$ and the two switch elements $Q_3$ and $Q_{3b}$, and a fourth basic unit comprises the flying capacitor $C_4$ and the two switch elements $Q_4$ and $Q_{4b}$. The input terminals of the fourth basic unit (voltage input terminal/high voltage side) are electrically connected with a high voltage DC bus (not shown) to receive an input voltage $V_1$. The output terminals of the fourth basic unit are connected with the input terminals of the third basic unit. The output terminals of the third basic unit are connected with the input terminals of the second basic unit. The output terminals of the second basic unit are connected with the input terminals of the first basic unit. Moreover, the first end and the second end of the flying capacitor of each basic unit $U_b$ are connected with the input terminals of the basic unit $U_b$ in parallel. The first end and the second end of the flying capacitor are respectively connected with the first ends of the two complementary switch elements at the upper side and the lower side. The second ends of the two complementary switch elements at the upper side and the lower side are connected with the input terminals of the downstream basic unit $U_b$. The output terminals of the first basic unit $U_b$ are connected with an end of the filtering inductor $L_f$. The switch elements of all basic units $U_b$ are selectively turned on or turned off. Consequently, plural DC levels are generated at the output terminals of the basic unit $U_b$ (i.e., the middle point, the positive voltage output terminal or the negative voltage output terminal). After plural DC levels are subjected to a low pass filtering operation by the filtering inductor $L_f$ and a filtering capacitor $C_f$, an output voltage $V_2$ is outputted to a low voltage side.

In a conventional voltage balance control method for the flying capacitor, the charging and discharging procedures of the flying capacitor are controlled to maintain the anticipated voltage value of the flying capacitor. Take the flying-capacitor (p+1)-level converter comprising p basic units $U_b$ as an example. From the low voltage side (i.e., the filtering inductor side) to the high voltage side (i.e., the DC power source side), the anticipated voltage of the flying capacitor of the m-th basic unit is $(V_1 \times m)/p$. As shown in FIG. 1, the anticipated voltages of the flying capacitors for the first-stage, the second-stage, the third-stage and the fourth-stage basic units of the five-level converter are $(V_1 \times 1)/4$, $(V_1 \times 2)/4$, $(V_1 \times 3)/4$ and $(V_1 \times 4)/4$, respectively. Since the two switch elements at the upper side and the lower side of each basic unit $U_b$ perform the complementary operations, the voltage withstood by each of the two complementary switch elements is the voltage difference between the present-stage flying capacitor and the next-stage flying capacitor (i.e., $V_1/4$). Generally, by adjusting the phases and duty cycles of the switch elements to generate the plural DC levels, the voltage or current of the filtering inductor at the low voltage side is controlled. Consequently, the function of switching and regulating power can be achieved.

Figure 2:
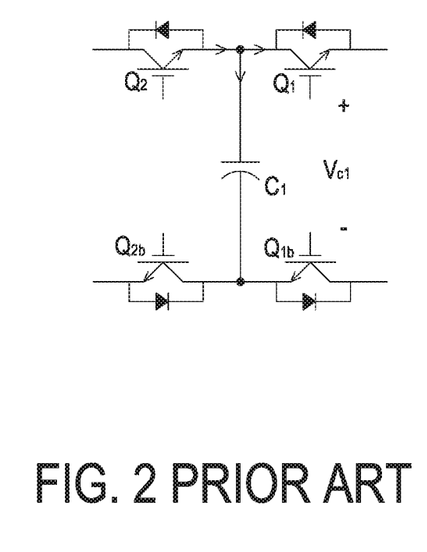
FIG. 2 is a schematic circuit diagram illustrating the relationship between a flying capacitor and the corresponding switch elements of the flying-capacitor multilevel converter of FIG. 1.

FIG. 2 is a schematic circuit diagram illustrating the relationship between a flying capacitor and the corresponding switch elements of the flying-capacitor multilevel converter of FIG. 1. As shown in FIG. 2, the flying capacitor $C_1$ is connected with two serially-connected switch elements $Q_1$, $Q_2$ and two serially-connected switch elements $Q_{1b}$, $Q_{2b}$. The on/off states of the switch elements $Q_1$ and $Q_2$ are complementary to on/oft states of the switch elements $Q_{1b}$ and $Q_{2b}$, respectively. By controlling the on/off states of the two adjacent switch elements, the charging/discharging procedure of the flying capacitor $C_1$ is achieved. In the normal working state, each basic unit $U_b$ is serially connected with the filtering inductor $L_f$ and the two switch elements at the upper side and the lower side of each basic unit $U_b$ perform the complementary operations. Consequently, the conduction current of each switch element is the current of the filter inductor. In a switching period T, the forward conduction directions of the switch elements $Q_2$ and $Q_1$ are identical to the positive direction of the inductor current. If the inductor current $I_L$ of the filtering inductor $L_f$ is stable, the relationships between the change amount $\Delta V_1$ of the voltage $V_{c1}$ of the flying capacitor $C_1$ and the duty cycles $D_1$ and $D_2$ of the two serially-connected switch elements $Q_1$ and $Q_2$ can be expressed by the following mathematic formulae:

$$\Delta V_1 = +I_L \times T_s \times (D_2 - D_1)/C_1, \text{ (if } I_L > 0)$$

$$\Delta V_1 = -I_L \times T_s \times (D_2 - D_1)/C_1, \text{ (if } I_L < 0)$$

The above two mathematic formulae can be rewritten as the following formula:

$$D_2 - D_1 = \text{sign} \times C_1/(I_L \times T_s) \times \Delta V_1,$$

wherein sign=+1 if $I_L > 0$, and sign=−1 if $I_L < 0$).

According to the above formula, a duty cycle difference between the duty cycles $D_1$ and $D_2$ of the two serially-connected switch elements $Q_1$ and $Q_2$ (i.e., $\Delta D = D_2 - D_1$) is an index of controlling the voltage balance of the flying capacitor. That is, the adjustment of the duty cycle difference $\Delta D$ is related to the anticipated voltage change amount $\Delta V_1$ of the flying capacitor $C_1$. In addition, the adjusting direction of the duty cycle difference $\Delta D$ is related to the current direction "sign" (i.e., the positive or negative sign of the inductor current $I_L$ of the filtering inductor).

As shown in the above formula, the adjusting direction of the duty cycle difference $\Delta D$ is determined according to the current direction (i.e., the positive or negative sign of the inductor current $I_L$). For achieving the voltage balance control of the flying capacitor, the control system has to realize the direction of the inductor current $I_L$. In other words, the current direction of the filtering inductor is an important factor influencing the charging/discharging procedure of the flying capacitor and maintaining the voltage balance of the flying capacitor.

However, the above voltage balance control method still has some drawbacks. For example, in case that the voltage is near the AC zero-crossing point of an AC/DC converter or a bidirectional power converter is operated under a light load condition, the ripple current generated by the high frequency switch element may result in the repeat switching action of the current direction. Moreover, because of the errors introduced through the measuring component, the measuring circuit and the digital sampling circuit, the control system may erroneously judge the current direction. Under this circumstance, it is difficult to control the voltage balance of the flying capacitor. Moreover, this problem limits the applications of the flying-capacitor multilevel converter.

Therefore, there is a need of providing a voltage balance control device and a voltage balance control method for a flying-capacitor multilevel converter in order to overcome the above drawbacks.

SUMMARY OF THE INVENTION

An object of the present invention provides a voltage balance control device and a voltage balance control method for a flying-capacitor multilevel converter in order to overcome the drawbacks of the conventional technologies.

In accordance with an aspect of the present invention, there is provided a voltage balance control device for a flying-capacitor multilevel converter. The flying-capacitor multilevel converter includes plural flying capacitors, even-numbered switch elements and a filtering inductor. The even-numbered switch elements are serially connected between a positive electrode and a negative electrode of a DC voltage source. The filtering inductor is connected with a middle point of the serially-connected even-numbered switch elements. A first end of each flying capacitor is connected with two adjacent switching elements at a first side of the middle point. A second end of each flying capacitor is connected with two adjacent switching elements at a second side of the middle point. The even-numbered switch elements are operated at the same switching period. The voltage balance control device includes a control signal processor, a voltage/current detecting unit, a capacitor voltage balance controller, a current direction forecasting unit, and a computing unit. The control signal processor generates plural control signals corresponding to the switch elements, thereby controlling on/off states of the switch elements. The voltage/current detecting unit is used for detecting voltage values of the plural flying capacitors to output a first detecting result, and detecting an operating status of the flying-capacitor multilevel converter to output a second detecting result. The capacitor voltage balance controller is used for generating plural first duty cycle differences according to a result of comparing the voltage values of the first detecting result with plural anticipated voltage values of the plural flying capacitors. The current direction forecasting unit is used for calculating a current direction adjusting signal in each adjusting period according to the voltage value of any selected flying capacitor from the first detecting result and a feedback signal. The feedback signal is related to the duty cycle difference between the duty cycles of the two serially-connected switch elements corresponding to the selected flying capacitor. The adjusting period is an integer multiple of the switching period. The computing unit is used for performing multiplication and/or division on the current direction adjusting signal and the plural first duty cycle differences, thereby generating corresponding second duty cycle differences. The control signal processor generates the plural control signals according to a reference value, the second detecting result and the plural second duty cycle differences. The voltage values of the plural flying capacitors are maintained at the corresponding anticipated voltage values according to the plural duty cycle signals.

In accordance with another aspect of the present invention, there is provided a voltage balance control method for a flying-capacitor multilevel converter. The flying-capacitor multilevel converter includes plural flying capacitors, even-numbered switch elements and a filtering inductor. The even-numbered switch elements are serially connected between a positive electrode and a negative electrode of a DC voltage source. The filtering inductor is connected with a middle point of the serially-connected even-numbered switch elements. A first end of each flying capacitor is connected with two adjacent switching elements at a first side of the middle point. A second end of each flying capacitor is connected with two adjacent switching elements at a second side of the middle point. The even-numbered switch elements are operated at the same switching period. The voltage balance control method includes the following steps. Firstly, plural control signals corresponding to the switch elements are generated to control on-off states of the switch elements. Then, a first detecting result is outputted according to voltage values of the plural flying capacitors, and a second detecting result is outputted according to an operating status of the flying-capacitor multilevel converter. Then, plural first duty cycle differences are generated according to a result of comparing the voltage values of the first detecting result with plural anticipated voltage values of the plural flying capacitors. Then, a current direction adjusting signal in each adjusting period is calculated according to the voltage value of any selected flying capacitor from the first detecting result and a feedback signal. The feedback signal is related to the duty cycle difference between the duty cycles of the two serially-connected switch elements corresponding to the selected flying capacitor, and the adjusting period is an integer multiple of the switching period. Then, multiplication and/or division is performed on the current direction adjusting signal and the plural first duty cycle differences, thereby generating corresponding second duty cycle differences. Afterwards, the plural control signals are generated according to a reference value, the second detecting result and the plural second duty cycle differences. The voltage values of the plural flying capacitors are maintained at the corresponding anticipated voltage values according to the plural duty cycle signals.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3:
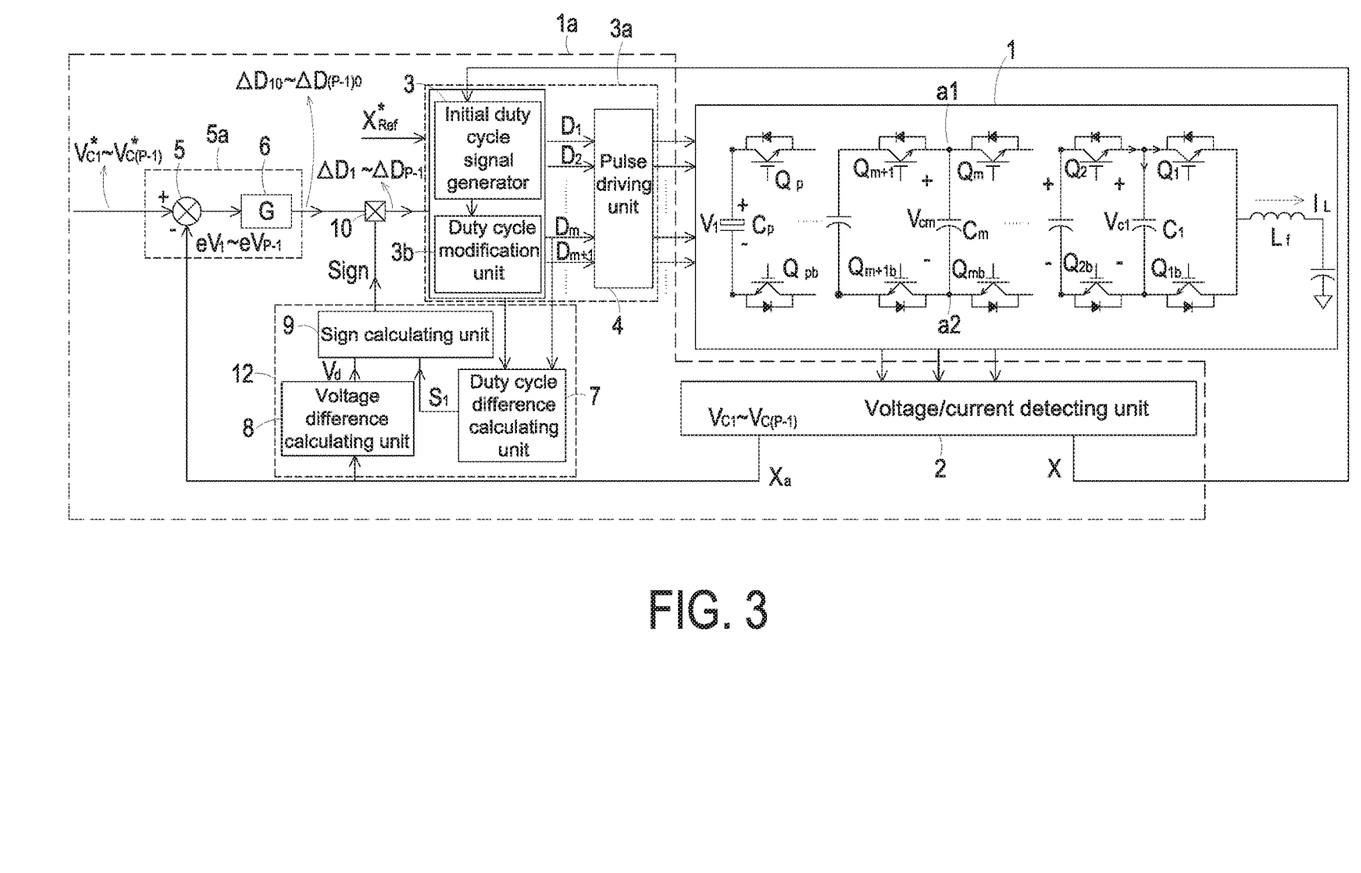
FIG. 3 is a schematic circuit diagram illustrating a voltage balance control device for a flying-capacitor multilevel converter according to a first embodiment of the present invention.

FIG. 3 is a schematic circuit diagram illustrating a voltage balance control device for a flying-capacitor multilevel converter according to a first embodiment of the present invention. The voltage balance control device 1a is applied to the flying-capacitor multilevel converter 1. The flying-capacitor multilevel converter 1 comprises p basic units. That is, the flying-capacitor multilevel converter 1 comprises p flying capacitors $C_1, C_2, \ldots, C_m, \ldots, C_p$. Moreover, 2p semiconductor switch elements $Q_1, Q_2, \ldots, Q_m, \ldots, Q_p$ and $Q_{1b}, Q_{2b}, \ldots, Q_{mb}, Q_{pb}$ are serially connected between a positive electrode and a negative electrode of a DC voltage source, wherein m is 1, 2, ..., (p−1). Moreover, a first end of each flying capacitor is connected with the two adjacent switching elements at a first node, and a second end of each flying capacitor is connected with the two adjacent switching elements at a second node. For example, the first end of the flying capacitor $C_m$ is connected with the two adjacent switching elements and $Q_{m+1}$ at a first node a1, and the second end of the flying capacitor Cm is connected with the two adjacent switching elements $Q_{m+1b}$ and $Q_{mb}$ at a second node a2. The plural switch elements are operated at the same switching period $T_s$.

The voltage balance control device 1a is electrically connected with the flying-capacitor multilevel converter 1. In this embodiment, the voltage balance control device 1a comprises a voltage/current detecting unit 2, a control signal processor 3a, a capacitor voltage balance controller 5a, a computing unit 10 and a current direction forecasting unit 12.

During operations of the flying-capacitor multilevel converter 1, the control signal processor 3a generates plural control signals corresponding to the switch elements. Consequently, the on/off states of the plural switch elements are controlled according to the plural control signals. The voltage/current detecting unit 2 is used for detecting the voltage values $V_{c1} \sim V_{c(p-1)}$ of the flying capacitors $C_1 \sim C_{p-1}$ (i.e., excluding the flying capacitor $C_p$), thereby outputting a first detecting result $X_a$. Moreover, the voltage/current detecting unit 2 is also used for detecting the operating status of the flying-capacitor multilevel converter 1, thereby outputting a second detecting result X. Preferably but not exclusively, the second detecting result X indicates one or plural voltage/current feedback values (e.g., the DC voltage feedback value, the DC current feedback value, the single-phase AC voltage feedback value, the single-phase AC current feedback value, the three-phase AC voltage feedback value and/or the three-phase current AC feedback value). In this embodiment, the voltage $V_{cp}$ of the flying capacitor $C_p$ is the input voltage $V_1$ of the flying-capacitor multilevel converter 1. Under this circumstance, it is not necessary to control the voltage of the flying capacitor $C_p$. In another embodiment, the voltage of the flying capacitor is controllable. The way of controlling the voltage of the flying capacitor $C_p$ is similar to the ways of controlling the voltage values $V_{c1} \sim V_{c(p-1)}$ of the flying capacitors $C_1 \sim C_{p-1}$.

The capacitor voltage balance controller 5a is electrically connected with the voltage/current detecting unit 2 to receive the first detecting result $X_a$. After the voltage values $V_{c1} \sim V_{c(p-1)}$ in the first detecting result $X_a$ are respectively compared with the anticipated voltage values $V_{c1}^* \sim V_{c(p-1)}^*$ of the flying capacitors $C_1 \sim C_{p-1}$, the capacitor voltage balance controller 5a generates plural comparing results and transforms the plural comparing result into corresponding first duty cycle differences $\Delta D_{10} \sim \Delta D_{(p-1)0}$.

The current direction forecasting unit 12 is electrically connected with the voltage/current detecting unit 2 for acquiring the voltage value of any selected flying capacitor (e.g., the voltage value $V_{cm}$ of the flying capacitor $C_m$) from the first detecting result $X_a$. Moreover, the current direction forecasting unit 12 is also electrically connected with the control signal processor 3a to receive a feedback signal from the control signal processor 3a. The feedback signal is related to the duty cycle difference between the duty cycles of the two serially-connected switch elements corresponding to the selected flying capacitor. According to the voltage value of the selected flying capacitor and the feedback signal, the current direction forecasting unit 12 calculates a current direction adjusting signal Sign in each adjusting period $T_d$. The adjusting period $T_d$ is an integer multiple of the switching period $T_s$.

The computing unit 10 is electrically connected with the capacitor voltage balance controller 5a and the current direction forecasting unit 12 to receive the current direction adjusting signal Sign and the first duty cycle differences $\Delta D_{10} \sim \Delta D_{(p-1)0}$. After the computing unit 10 performs multiplication and/or division on the current direction adjusting signal Sign and the first duty cycle differences $\Delta D_{10} \sim \Delta D_{(p-1)0}$, the corresponding second duty cycle differences $\Delta D_1 \sim \Delta D_{p-1}$ are obtained.

The control signal processor 3a is electrically connected with the computing unit 10 and the voltage/current detecting unit 2. The control signal processor 3a receives the second detecting result X, the second duty cycle differences $\Delta D_1 \sim \Delta D_{p-1}$ and a reference value $X_{Ref}^*$. The reference value $X_{Ref}^*$ indicates the given values of one or plural voltages or currents of the flying-capacitor multilevel converter 1 (e.g., the DC voltage given value, the DC current given value, the single-phase AC voltage given value, the single-phase AC current given value, the three-phase AC voltage given value and/or the three-phase current AC given value). According to the second detecting result X, the second duty cycle differences $\Delta D_1 \sim \Delta D_{p-1}$ and the reference value $X_{Ref}^*$, the control signal processor 3a generates plural duty cycle signals $D_1, D_2, \ldots, D_m, \ldots, D_p$. According to the plural duty cycle signals, the control signal processor 3a adjusts the plural control signals. Consequently, the voltage values $V_{c1} \sim V_{c(p-1)}$ of the flying capacitors $C_1 \sim C_{p-1}$ are maintained at the anticipated voltage values $V_{c1}^* \sim V_{c(p-1)}^*$.

In this embodiment, the capacitor voltage balance controller 5a further comprises a voltage error generator 5 and a voltage error transforming unit 6. The voltage error generator 5 is electrically connected with the voltage/current detecting unit 2 to receive the first detecting result $X_a$. According to the result of comparing the voltage values $V_{c1} \sim V_{c(p-1)}$ of the flying capacitors $C_1 \sim C_{p-1}$ of the first detecting result $X_a$ with the anticipated voltage values $V_{c1}^* \sim V_{c(p-1)}^*$, the voltage error generator 5 generates corresponding voltage error values $eV_1 \sim eV_{p-1}$. The voltage error transforming unit 6 is electrically connected with the voltage error generator 5. The voltage error transforming unit 6 is used for transforming the voltage error values $eV_1 \sim eV_{p-1}$ into the first duty cycle differences $\Delta D_{10} \sim \Delta D_{(p-1)0}$ according to a G function. The G function is a function of the gain value of the voltage error transforming unit 6. An example of the voltage error transforming unit 6 includes but is not limited to a digital PID controller or a hysteresis loop controller.

The control signal processor 3a further comprises an initial duty cycle signal generator 3, a duty cycle modification unit 3b and a pulse driving unit 4. The initial duty cycle signal generator 3 is electrically connected with the voltage/current detecting unit 2 to receive the second detecting result X. By comparing the second detecting result X with the reference value $X_{Ref}^*$, the initial duty cycle signal generator 3 generates an initial duty cycle signal. The duty cycle modification unit 3b is electrically connected with the computing unit 10 and the initial duty cycle signal generator 3. According to the initial duty cycle signal and the second duty cycle differences $\Delta D_1 \sim \Delta D_{p-1}$, the duty cycle modification unit 3b generates the plural duty cycle signals $D_1, D_2, \ldots, D_m, \ldots, D_p$. The pulse driving unit 4 is electrically connected with the duty cycle modification unit 3b. The pulse driving unit 4 is used for transforming the plural duty cycle signals $D_1, D_2, \ldots, D_m, \ldots, D_p$ into the plural control signals in order to control the on/off states of the plural switch elements.

The way of calculating the current direction adjusting signal Sign and the circuitry configurations of the current direction forecasting unit 12 will be illustrated in more details as follows. In a switching period $T_s$, the relationships between the voltage change amount $\Delta V_m$ of the flying capacitor $C_m$, the inductor current $I_L$ of the filtering inductor $L_f$, the duty cycles $D_m$ and $D_{m+1}$ of the two serially-connected switch elements $Q_m$ and $Q_{m+1}$ can be expressed by the following mathematic formulae:

$\Delta V_m = \text{sign} \times I_L \times T_s \times (D_{m+1} - D_m)/C_m$, wherein sign=+1 if $I_L > 0$, and sign=-1 if $I_L < 0$.

The above two mathematic formulae can be rewritten as the following formula:

$\text{sign} = (D_{m+1} - D_m) \times C_m / (I_L \times T_s) \times \Delta V_m$

From the above formula, the direction of the average inductor current $I_L$ of the filtering inductor $L_f$ in a switching period $T_s$ can be realized according to the relationship between the voltage change amount $\Delta V_m$ of the flying capacitor $C_m$ and the duly cycle difference $(D_{m+1} - D_m)$ after the switching period $T_s$ is ended. If the direction of the inductor current $I_L$ is kept unchanged within a certain time interval (e.g., several switching period $T_s$), the direction of the inductor current in the next switching period can be forecasted according to the above calculation on the previous switching period within the certain time period.

As mentioned above, the adjusting period $T_d$ is an integer multiple of the switching period $T_s$. In the time interval of several adjusting periods, the direction of the inductor current is periodically calculated and forecasted, and the adjusting amount and the adjusting direction of the duty cycle difference to control the duty cycles of all switch elements are realized. Consequently, the voltage balance control of the flying capacitor $C_m$ is achieved. In the k-th adjusting period $T_d$, the direction of the inductor current is forecasted according to the calculation in the (k-1)-th adjusting period $T_d$. The calculation may be expressed by the following formulae (1) and (2):

$$\text{sign}[0] = +1 \text{ or } -1 \quad (1)$$
(i.e., if $k = 0$, the initial sign is 1 or $-1$)

$$\text{sign}[k] = \text{SIGN}\left\{(Vcm[k] - Vcm[k-1]) \times \sum_{n=(k-1)\times\left(\frac{Td}{Ts}\right)}^{k\times\left(\frac{Td}{Ts}\right)-1} (D_{m+1}[n] - D_m[n])\right\} \quad (2)$$

The above way of acquiring the current direction adjusting signal Sign can be implemented with the control mechanism of FIG. 3. Please refer to FIG. 3 again. In this embodiment, the feedback signal received by the current direction forecasting unit 12 is the duty cycle difference between the duty cycles of the two serially-connected switch elements corresponding to the selected flying capacitor. For example, the flying capacitor $C_m$ is the selected flying capacitor. The difference between the duty cycles $D_m$ and $D_{m+1}$ of the two serially-connected switch elements $Q_t$ and $Q_{m+1}$ indicates the feedback signal.

For forecasting the direction of the inductor current $I_L$, it is necessary to know the voltage change amount $\Delta V_m$ of the flying capacitor $C_m$ in every adjusting period $T_d$ and the average value or the cumulative value of the duty cycle difference $(D_{m+1}-D_m)$ in every adjusting period $T_d$. In this embodiment, the current direction forecasting unit 12 comprises a duty cycle difference calculating unit 7, a voltage difference calculating unit 8 and a sign calculating unit 9. The voltage difference calculating unit 8 is electrically connected with the voltage/current detecting unit 2 to receive the first detecting result $X_a$. Consequently, the voltage value $V_{cm}[k]$ of the selected flying capacitor $C_m$ in the k-th adjusting period $T_d$ and the voltage value $V_{cm}[k-1]$ of the selected flying capacitor $C_m$ in the (k−1)-th adjusting period $T_d$ are acquired. By comparing the voltage value $V_{cm}[k]$ with the voltage value $V_{cm}[k-1]$, the voltage difference calculating unit 8 generates a voltage difference value $V_d$. The duty cycle difference calculating unit 7 is electrically connected with the control signal processor 3a to receive the duty cycles $D_m$ and $D_{m+1}$ of the selected flying capacitor $C_m$. Moreover, the duty cycle difference calculating unit 7 calculates the duty cycle difference between the duty cycles $D_m$ and $D_{m+1}$ in every switch period $T_s$. After the average value or the cumulative value of the duty cycle difference $(D_{m+1}-D_m)$ of all switching periods $T_s$ in the adjusting period $T_d$ is calculated, the duty cycle difference calculating unit 7 issues a first computing result S1. The sign calculating unit 9 is electrically connected with the duty cycle difference calculating unit 7 and the voltage difference calculating unit 8. After the sign calculating unit 9 performs multiplication and/or division on the voltage difference value $V_d$ and the first computing result S1, a second computing result is obtained. According to the positive value or the negative value of the second computing result, the sign calculating unit 9 generates the corresponding current direction adjusting signal Sign.

In some embodiments, the duty cycle difference $(D_{m+1}-D_m)$ of the two serially-connected switch elements $Q_m$ and $Q_{m+1}$ corresponding to the selected flying capacitor $C_m$ is identical to the first duty cycle difference $\Delta D_{m0}$ from the capacitor voltage balance controller 5a. Under this circumstance, the adjusting amount of the duty cycle difference to control the voltage balance of the selected flying capacitor $C_m$ in every switching period $T_s$ of the k-th adjusting period $T_d$ may be expressed by the following formula (3).

$$D_{m+1}[n] - D_m[n] = \text{sign}[k] \times G(eV_m[n]), n \in \{k \times (T_d, T_s), \quad (3)$$
$$(k+1) \times (T_d/T_s)\}$$
$$= \text{sign}[k] \times \Delta D_{m0}[n], \{\Delta D_{m0}[n] = G(eV_m[n])\}$$

After the adjusting amount of the duty cycle difference obtained in the formula (3) is substituted into the formula (2), the following formula (4) is obtained:

$$\sum_{n=(k-1)\times\left(\frac{Td}{Ts}\right)}^{k\times\left(\frac{Td}{Ts}\right)-1} (D_{m+1}[n] - D_m[n]) = \text{sign}[k-1] \times \sum_{n=(k-1)\times\left(\frac{Td}{Ts}\right)}^{k\times\left(\frac{Td}{Ts}\right)-1} \Delta D_{m0}[n] \quad (4)$$

Consequently, the forecasted direction of the inductor current is calculated according to the following formula (5):

$$\text{sign}[k] = \quad (5)$$
$$\text{SIGN}\left\{(Vcm[k] - Vcm[k-1]) \times \text{sign}[k-1] \times \sum_{n=(k-1)\times\left(\frac{Td}{Ts}\right)}^{k\times\left(\frac{Td}{Ts}\right)-1} \Delta D_{m0}[n]\right\}$$

Figure 4:
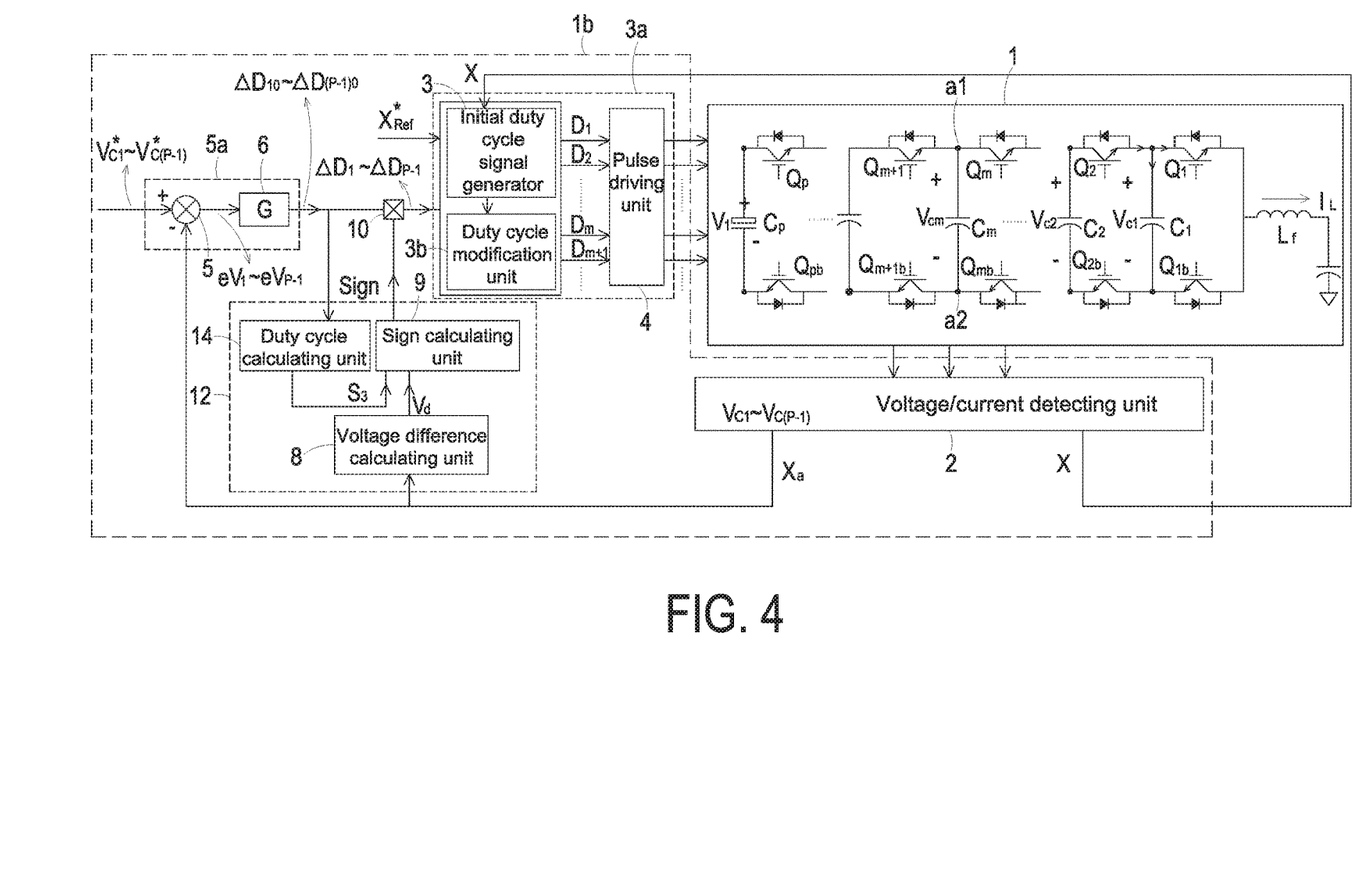
FIG. 4 is a schematic circuit diagram illustrating a voltage balance control device for a flying-capacitor multilevel converter according to a second embodiment of the present invention.

The above way of acquiring the current direction adjusting signal Sign can be implemented with the control mechanism of FIG. 4. FIG. 4 is a schematic circuit diagram illustrating a voltage balance control device for a flying-capacitor multilevel converter according to a second embodiment of the present invention. Component parts and elements corresponding to those of the first embodiment are designated by identical numeral references, and detailed descriptions thereof are omitted. In FIG. 3, the current direction forecasting unit 12 of the voltage balance control device 1a is electrically connected with the control signal processor 3a. In comparison with FIG. 3, the current direction forecasting unit 12 of the voltage balance control device 1b of this embodiment is electrically connected with the output terminal of the voltage error transforming unit 6 of the capacitor voltage balance controller 5a and the computing unit 10. That is, the current direction forecasting unit 12 receives the first duty cycle differences $\Delta D_{10}$~$\Delta D_{(p-1)0}$ from the voltage error transforming unit 6. In this embodiment, the feedback signal received by the current direction forecasting unit 12 is the first duty cycle difference $\Delta D_{m0}$ corresponding to the selected flying capacitor $C_m$. In this embodiment, the duty cycle difference $(D_{m+1}-D_m)$ of the two serially-connected switch elements $Q_m$ and $Q_{m+1}$ corresponding to the selected flying capacitor $C_m$ is identical to the first duty cycle difference $\Delta D_{m0}$ from the capacitor voltage balance controller 5a. In other words, the feedback signal is also related to the duty cycle difference between the duty cycles of the two serially-connected switch elements corresponding to the selected flying capacitor.

In this embodiment, the current direction forecasting unit 12 comprises a voltage difference calculating unit 8, a duty cycle calculating unit 14 and a sign calculating unit 9. The voltage difference calculating unit 8 is electrically connected with the voltage/current detecting unit 2 to receive the first detecting result $X_a$. Consequently, the voltage value $V_{cm}[k]$ of the selected flying capacitor $C_m$ in the k-th adjusting period $T_d$ and the voltage value $V_{cm}[k-1]$ of the selected flying capacitor $C_m$ in the (k−1)-th adjusting period $T_d$ are acquired. By comparing the voltage value $V_{cm}[k]$ with the voltage value $V_{cm}[k-1]$, the voltage difference calculating unit 8 generates a voltage difference value $V_d$. The duty cycle calculating unit 14 is electrically connected with the output terminal of the capacitor voltage balance controller 5a to receive the first duty cycle difference $\Delta D_{m0}$ corresponding to the selected flying capacitor $C_m$. Moreover, the duty cycle calculating unit 14 calculates the first duty cycle difference $\Delta D_{m0}$ in every switch period $T_s$. After the average value or the cumulative value of the first duty cycle difference $\Delta D_{m0}$ of all switching periods $T_s$ in the adjusting period $T_d$ is calculated, the duty cycle calculating unit 14 issues a third computing result S3. The sign calculating unit 9 is electrically connected with the duty cycle calculating unit 14, the voltage difference calculating unit 8 and the computing unit 10 to receive the voltage difference value $V_d$ from the voltage difference calculating unit 8 and the third computing result S3 from the duty cycle calculating unit 14. Moreover, the sign calculating unit 9 also receives the current direction adjusting signal sign[k−1] in the previous adjusting period, i.e., the (k−1)-th adjusting period $T_d$. After the sign calculating unit 9 performs multiplication and/or division on the voltage difference value $V_d$, the third computing result S3 and the current direction adjusting signal sign[k−1], a fourth computing result is obtained. According to the positive value or the negative value of the fourth computing result, the sign calculating unit 9 generates the corresponding current direction adjusting signal Sign.

In some embodiments, the G function is provided by a proportional regulator Kp (Kp>0). Consequently, the formula ((5) is rewritten as the following formula (6).

$$\text{sign}[k] = \text{SIGN}\left\{(Vcm[k] - Vcm[k-1]) \times \text{sign}[k-1] \times \sum_{n=(k-1)\times\left(\frac{Td}{Ts}\right)}^{k\times\left(\frac{Td}{Ts}\right)-1} eV_m[n]\right\} \quad (6)$$

Figure 5:
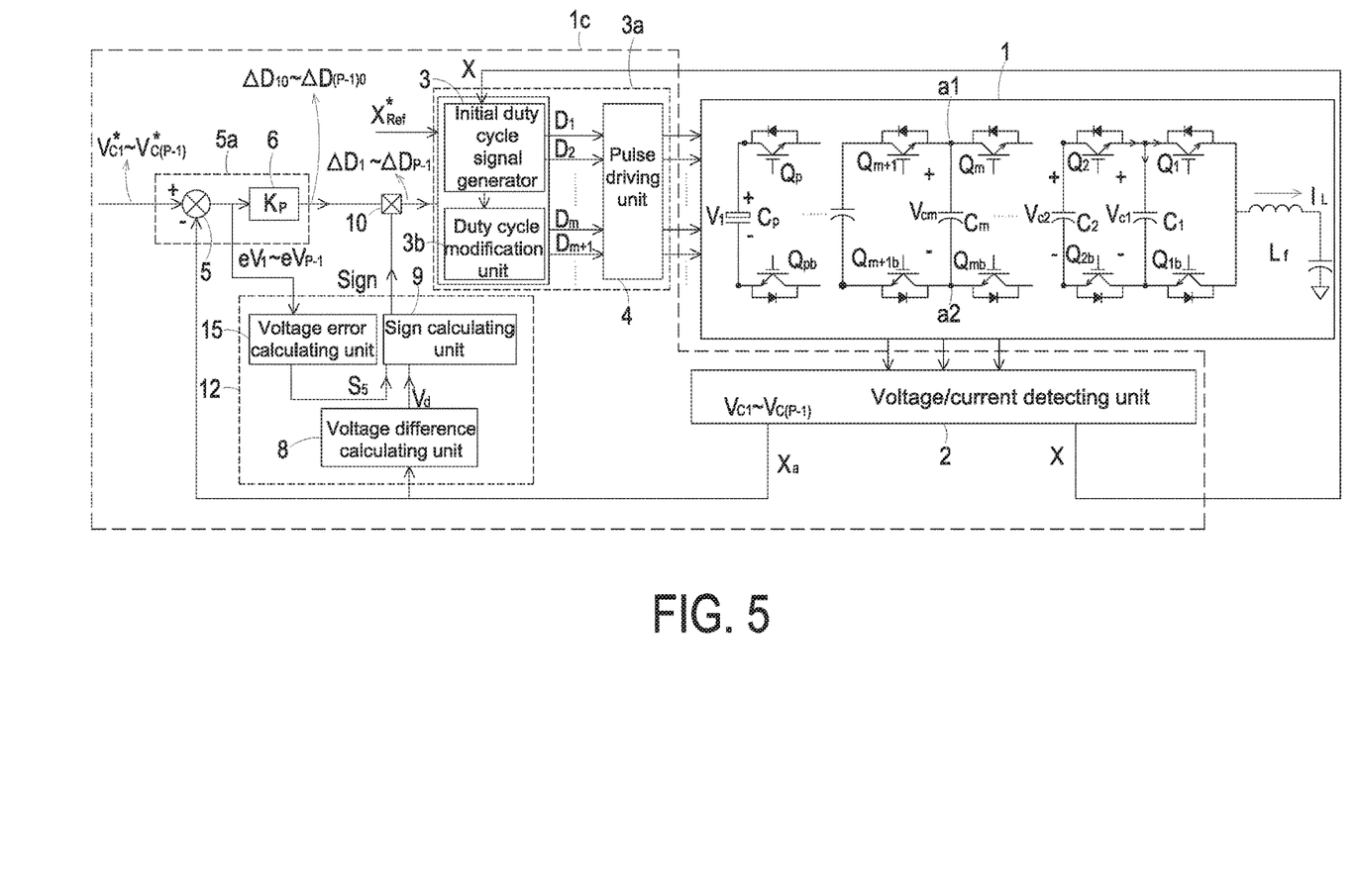
FIG. 5 is a schematic circuit diagram illustrating a voltage balance control device for a flying-capacitor multilevel converter according to a third embodiment of the present invention.

The above way of acquiring the current direction adjusting signal Sign can be implemented with the control mechanism of FIG. 5. FIG. 5 is a schematic circuit diagram illustrating a voltage balance control device for a flying-capacitor multilevel converter according to a third embodiment of the present invention. Component parts and elements corresponding to those of the first embodiment are designated by identical numeral references, and detailed descriptions thereof are omitted. As mentioned above, the voltage error transforming unit 6 of the voltage balance control device of FIG. 3 is a digital PID controller or a hysteresis loop controller, and the current direction forecasting unit 12 of the voltage balance control device 1a is electrically connected with the control signal processor 3a. In comparison with FIG. 3, the voltage error transforming unit 6 of the voltage balance control device 1c of this embodiment is a proportional regulator. Moreover, the current direction forecasting unit 12 of the voltage balance control device 1c of this embodiment is electrically connected with the output terminal of the voltage error generator 5. That is, the current direction forecasting unit 12 receives the voltage error value $eV_m$ corresponding to the selected flying capacitor $C_m$ from the voltage error generator 5. In this embodiment, the feedback signal received by the current direction forecasting unit 12 is the voltage error value $eV_m$ corresponding to the selected flying capacitor $C_m$. In this embodiment, the duty cycle difference $(D_{m-1} - D_m)$ of the two serially-connected switch elements $Q_m$ and $Q_{m+1}$ corresponding to the selected flying capacitor $C_m$ is identical to the first duty cycle difference $\Delta D_{m0}$ from the capacitor voltage balance controller 5a, and the G function is provided by the proportional regulator. In other words, the feedback signal is also related to the duty cycle difference between the duty cycles of two serially-connected switch elements corresponding to the selected flying capacitor.

In this embodiment, the current direction forecasting unit 12 comprises a voltage difference calculating unit 8, a voltage error calculating unit 15 and a sign calculating unit 9. The voltage difference calculating unit 8 is electrically connected with the voltage/current detecting unit 2 to receive the first detecting result $X_a$. Consequently, the voltage value $V_{cm}[k]$ of the selected flying capacitor $C_m$ in the k-th adjusting period $T_d$ and the voltage value $V_{cm}[k-1]$ of the selected flying capacitor $C_m$ in the (k−1)-th adjusting period $T_d$ are acquired. By comparing the voltage value $V_{cm}[k]$ with the voltage value $V_{cm}[k-1]$, the voltage difference calculating unit 8 generates a voltage difference value $V_d$. The voltage error calculating unit 15 is electrically connected between the voltage error generator 5 and the voltage error transforming unit 6 to receive the voltage error value $eV_m$ corresponding to the selected flying capacitor $C_m$. Moreover, the voltage error calculating unit 15 calculates the voltage error value $eV_m$ in every switch period $T_s$. After the average value or the cumulative value of the voltage error value $eV_m$ of all switching periods $T_s$ in the adjusting period $T_d$ is calculated, the voltage error calculating unit 15 issues a fifth computing result S5.

The sign calculating unit 9 is electrically connected with the voltage error calculating unit 15, the voltage difference calculating unit 8 and the computing unit 10 to receive the voltage difference value $V_d$ from the voltage difference calculating unit 8 and the fifth computing result S5 from the voltage error calculating unit 15. Moreover, the sign calculating unit 9 also receives the current direction adjusting signal sign[k−1] in the previous adjusting period, i.e., the (k−1)-th adjusting period $T_d$. After the sign calculating unit 9 performs multiplication and/or division on the voltage difference value $V_d$, the fifth computing result S5 and the current direction adjusting signal sign[k−1], a sixth computing result is obtained. According to the positive value or the negative value of the sixth computing result, the sign calculating unit 9 generates the corresponding current direction adjusting signal Sign.

Figure 6:
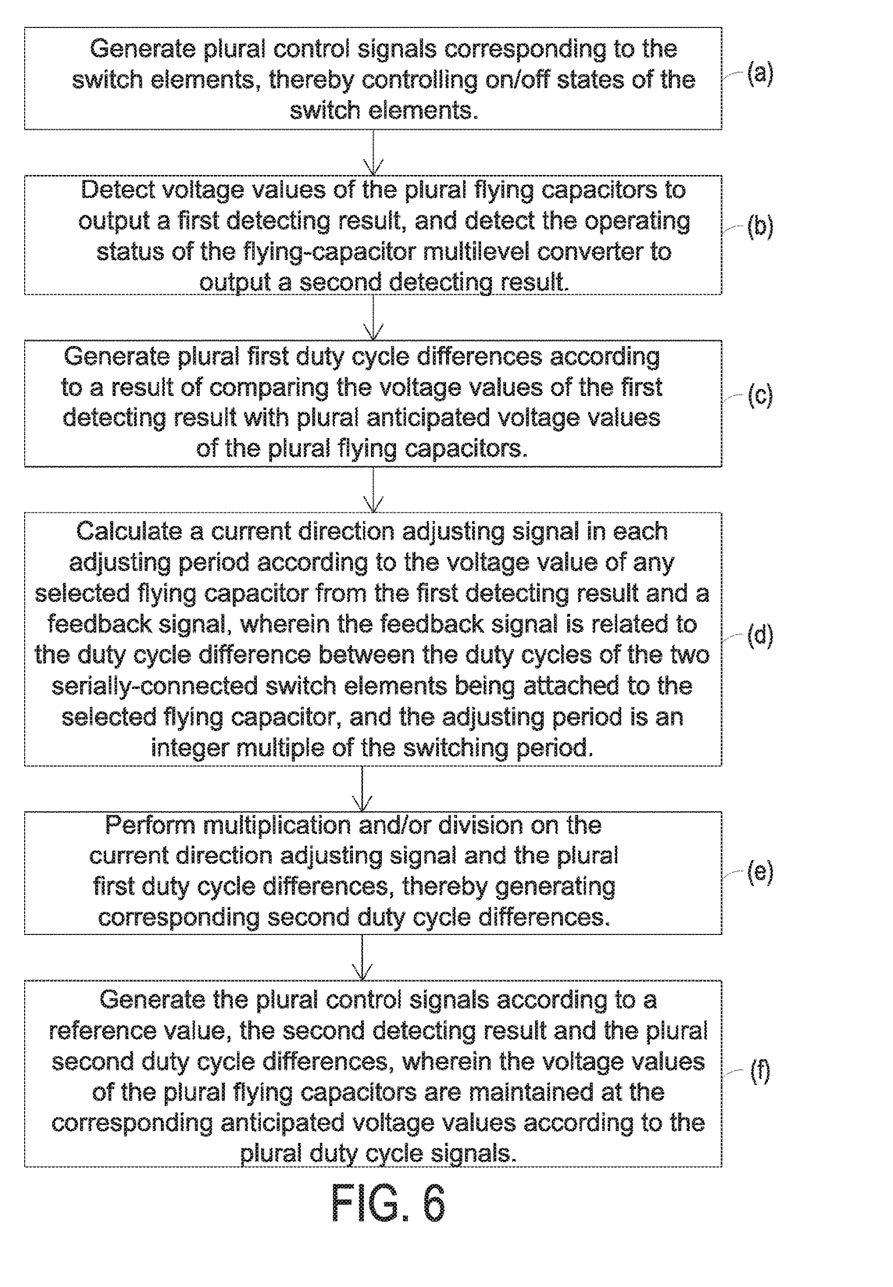
FIG. 6 is a flowchart illustrating a voltage balance control method for a flying-capacitor multilevel converter according to an embodiment of the present invention.

The present invention further comprises a voltage balance control method for a flying-capacitor multilevel converter. The voltage balance control method is applied to the voltage balance control devices of FIGS. 3, 4 and 5. FIG. 6 is a flowchart illustrating a voltage balance control method for a flying-capacitor multilevel converter according to an embodiment of the present invention.

Firstly, in a step (a), plural control signals corresponding to the switch elements are generated to control on/off states of the switch elements.

Then, in a step (b), the voltage values $V_{c1} \sim V_{c(p-1)}$ of the flying capacitors $C_1 \sim C_{p-1}$ (i.e., excluding the flying capacitor $C_p$) is detected to output a first detecting result $X_a$, and the operating status of the flying-capacitor multilevel converter 1 is detected to output a second detecting result X.

Then, in a step (c), the voltage values $V_{c1} \sim V_{c(p-1)}$ in the first detecting result $X_a$ are respectively compared with the anticipated voltage values $V_{c1}^* \sim V_{c(p-1)}^*$ of the flying capacitors $C_1 \sim C_{p-1}$, and thus corresponding first duty cycle differences $\Delta D_{10} \sim \Delta D_{(p-1)0}$ are generated according to the comparing results.

In a step (d), a current direction adjusting signal Sign in each adjusting period $T_d$ is calculated according to the voltage value of any selected flying capacitor (e.g., the voltage value $V_{cm}$ of the flying capacitor $C_m$) acquired from the first detecting result $X_a$ and a feedback signal. The adjusting period $T_d$ is an integer multiple of the switching period $T_s$.

In a step (e), multiplication and/or division is performed on the current direction adjusting signal Sign and the first duty cycle differences $\Delta D_{10} \sim \Delta D_{(p-1)0}$, and thus the corresponding second duty cycle differences $\Delta D_1 \sim \Delta D_{p-1}$ are obtained.

In a step (f), plural duty cycle signals $D_1, D_2, \ldots, D_m, \ldots, D_p$ are generated according to the second detecting result X, the second duty cycle differences $\Delta D_1 \sim \Delta D_{p-1}$ and the reference value $X_{Ref}^*$. According to the plural duty cycle signals, the plural control signals are correspondingly adjusted. Consequently, the voltage values $V_{c1} \sim V_{c(p-1)}$ of the flying capacitors $C_1 \sim C_{p-1}$ are maintained at the anticipated voltage values $V_{c1}^* \sim V_{c(p-1)}^*$.

In case that the voltage balance control method is applied to the voltage balance control device of FIG. 3, the feedback signal is the difference between the duty cycles $D_m$ and $D_{m+1}$ of the two serially-connected switch elements $Q_m$ and $Q_{m+1}$ corresponding to the flying capacitor $C_m$. Under this circumstance, the step (d) further comprises sub-steps (d1), (d2) and (d3). In the sub-step (d1), the voltage value $V_{cm}[k]$ of the selected flying capacitor $C_m$ in the k-th adjusting period $T_d$ and the voltage value $V_{cm}[k-1]$ of the selected flying capacitor $C_m$ in the (k-1)-th adjusting period $T_d$ are acquired, and a voltage difference value $V_d$ is generated according to a result of comparing the voltage value $V_{cm}[k]$ with the voltage value $V_{cm}[k-1]$. In the sub-step (d2), the duty cycle difference between the duty cycles $D_m$ and $D_{m+1}$ in every switch period $T_s$ is calculated, and a first computing result S1 is generated according to the average value or the cumulative value of the duty cycle difference $(D_{m+1}-D_m)$ of all switching periods $T_s$ in the adjusting period $T_d$. In the sub-step (d3), multiplication and/or division is performed on the voltage difference value $V_d$ and the first computing result S1, so that a second computing result is obtained. According to the positive value or the negative value of the second computing result, the sign calculating unit 9 generates the corresponding current direction adjusting signal Sign.

In case that the voltage balance control method is applied to the voltage balance control device of FIG. 4, the feedback signal is the first duty cycle difference $\Delta D_{m0}$ corresponding to the selected flying capacitor $C_m$. Under this circumstance, the step (d) further comprises sub-steps (d1), (d2) and (d3). In the sub-step (d1), the voltage value $V_{cm}[k]$ of the selected flying capacitor $C_m$ in the k-th adjusting period $T_d$ and the voltage value $V_{cm}[k-1]$ of the selected flying capacitor $C_m$ in the (k-1)-th adjusting period $T_d$ are acquired, and a voltage difference value $V_d$ is generated according to a result of comparing the voltage value $V_{cm}[k]$ with the voltage value $V_{cm}[k-1]$. In the sub-step (d2), the first duty cycle difference $\Delta D_{m0}$ in every switch period $T_s$ is calculated and a third computing result S3 is generated according to the average value or the cumulative value of the first duty cycle difference $\Delta D_{m0}$ of all switching periods $T_s$ in the adjusting period $T_d$. In the sub-step (d3), multiplication and/or division is performed on the voltage difference value $V_d$, the third computing result S3 and the current direction adjusting signal sign[k-1], so that a fourth computing result is obtained. According to the positive value or the negative value of the fourth computing result, the sign calculating unit 9 generates the corresponding current direction adjusting signal Sign.

In case that the voltage balance control method is applied to the voltage balance control device of FIG. 5, the step (c) further comprises sub-steps (c1) and (c2). In the sub-step (c1), plural voltage error values $eV_1 \sim eV_{p-1}$ are generated according to a result of comparing the voltage values $V_{c1} \sim V_{c(p-1)}$ of the flying capacitors $C_1 \sim C_{p-1}$ of the first detecting result $X_a$ with the anticipated voltage values $V_{c1}^* \sim V_{c(p-1)}^*$. In the sub-step (c2), the voltage error values $eV_1 \sim eV_{p-1}$ are transformed into the first duty cycle differences $\Delta D_{10} \sim \Delta D_{(p-1)0}$.

Moreover, in case that the voltage balance control method is applied to the voltage balance control device of FIG. 5, the feedback signal is the voltage error value $eV_m$ corresponding to the selected flying capacitor $C_m$. Under this circumstance, the step (d) further comprises sub-steps (d1), (d2) and (d3). In the sub-step (d1), the voltage value $V_{cm}[k]$ of the selected flying capacitor $C_m$ in the k-th adjusting period $T_d$ and the voltage value $V_{cm}[k-1]$ of the selected flying capacitor $C_m$ in the (k-1)-th adjusting period $T_d$ are acquired, and a voltage difference value $V_d$ is generated according to a result of comparing the voltage value $V_{cm}[k]$ with the voltage value $V_{cm}[k-1]$. In the sub-step (d2), the voltage error value $eV_m$ in every switch period $T_s$ is calculated and a fifth computing result S5 is generated according to the average value or the cumulative value of the voltage error value $eV_m$ of all switching periods $T_s$ in the adjusting period $T_d$. In the sub-step (d3), multiplication and/or division is performed on the voltage difference value $V_d$, the fifth computing result S5 and the current direction adjusting signal sign[k-1], so that a sixth computing result is obtained. According to the positive value or the negative value of the sixth computing result, the sign calculating unit 9 generates the corresponding current direction adjusting signal Sign.

Figure 7:
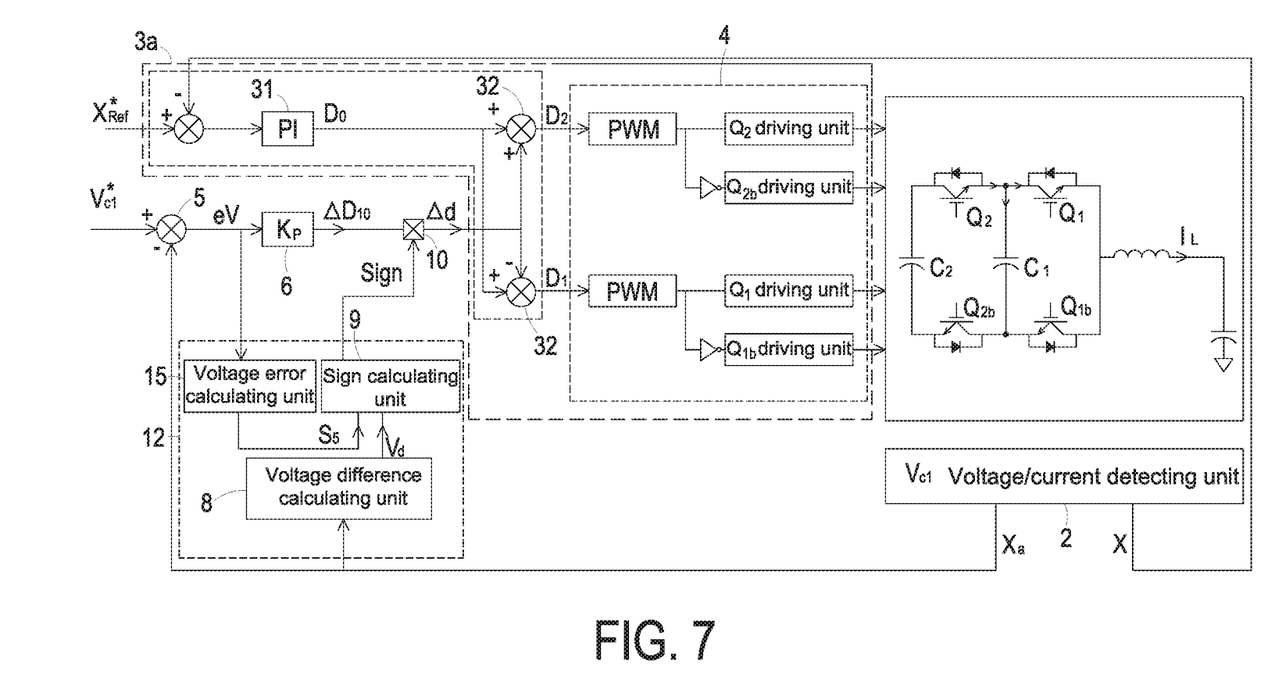
FIG. 7 is a schematic circuit diagram illustrating a voltage balance control device for a flying-capacitor three-level converter according to a third embodiment of the present invention.

An implementation example of the voltage balance control device of the present invention will be described as follows. FIG. 7 is a schematic circuit diagram illustrating a voltage balance control device for a flying-capacitor three-level converter according to a third embodiment of the present invention. The circuitry configuration of the voltage balance control device of this embodiment is based on the circuitry configuration of the voltage balance control device of FIG. 5. In this embodiment, the reference value $X_{Ref}^*$ indicates a given value of the output current, the second detecting result X indicates the inductor current $I_L$, the initial duty cycle signal generator 3 of the control signal processor 3a comprises a PI regulator 31, and the duty cycle modification unit 3b of the control signal processor 3a comprises two duty cycle addition/subtraction units 32. The duty cycle modification unit 3b generates the duty cycle signals $D_1$ and $D_2$ corresponding to the switch elements $Q_1$, $Q_{1b}$ and $Q_2$, $Q_{2b}$. The duty cycle signals $D_1$ and $D_2$ are transmitted to the pulse driving unit 4.

The voltage error transforming unit 6 is a proportional regulator Kp. The voltage error transforming unit 6 generates the first duty cycle difference $\Delta D_{10}$. After the computing unit 10 performs multiplication on the current direction adjusting signal Sign and the first duty cycle difference $\Delta D_{10}$, the corresponding second duty cycle difference $\Delta d$ is obtained. Then, the two duty cycle addition/subtraction units 32 perform addition/subtraction on the second duty cycle difference $\Delta d$ and the initial duty cycle signal $D_0$. Consequently, the duty cycle signal $D_1$ corresponding to the switch elements $Q_1$, $Q_{1b}$, and the duty cycle signal $D_2$ corresponding to the switch elements $Q_2$, $Q_{2b}$ are obtained. The current direction adjusting signal Sign is periodically calculated. Moreover, the adjusting period $T_d$ corresponding to the flying capacitor $C_1$ is ten times the switching period $T_s$. After the multiplication is performed on the voltage difference value $V_d$ corresponding to the flying capacitor $C_1$ in an adjusting period $(V_d=V_{c1}[t]-V_{c1}[t-T_d])$, the average value of the voltage error value $eV_1$ corresponding to the flying capacitor $C_1$ in an adjusting period $(eV_1=V^*_{c1}-V_{c1})$ and the current direction adjusting signal sign[t-Td] in the previous adjusting period, the current direction adjusting signal Sign is obtained.

As mentioned above, the voltage error value $eV_1$ corresponding to the flying capacitor $C_1$ is expressed as $eV_1=V^*_{c1}-V_{c1}$. If the voltage value $V_{c1}$ of the flying capacitor $C_1$ is lower than the anticipated voltage value $V^*_{c1}$, the voltage error value $eV_1$ is positive. Consequently, it is necessary to charge the flying capacitor $C_1$ to increase the voltage value of the flying capacitor $C_1$. After the voltage error value $eV_1$ is adjusted by the proportional regulator Kp, the first duty cycle difference $\Delta D_{10}$ having a positive value is obtained. In accordance with a method of increasing the voltage value of the flying capacitor $C_1$, the amount of charges to be charged or discharged in every switching period $T_s$ is adjusted. If the direction of the inductor current $I_L$ is positive, the multiplication on the first duty cycle difference $\Delta D_{10}$ and the current direction adjusting signal Sign (e.g., +1) generates the second duly cycle difference $\Delta d$. After the second duty cycle difference $\Delta d$ and the initial duty cycle signal $D_0$ from the PI regulator 31 are added, the duty cycle signal $D_2$ corresponding to the switch elements $Q_2$ is obtained. Moreover, $D_2-D=2\Delta d$ ($\Delta d>0$). Consequently, in a switching period $T_s$, the charging time of the flying capacitor $C_1$ is increased and the discharging time is decreased. Under this circumstance, the voltage value $V_{c1}$ of the flying capacitor $C_1$ is increased to approach the anticipated voltage value $V^*_{c1}$. If the direction of the inductor current $I_L$ is negative, the multiplication on the first duty cycle difference $\Delta D_{10}$ and the current direction adjusting signal Sign (e.g., +1) generates the second duty cycle difference $\Delta d$. After the second duty cycle difference $\Delta d$ and the initial duly cycle signal $D_0$ from the PI regulator 31 are added, the duly cycle signal $D_2$ corresponding to the switch elements $Q_2$ is obtained. Moreover, $D_2-D_1=2\Delta d$ ($\Delta d<0$). The indicator current is in the negative direction. Consequently, in a switching period $T_s$, the charging time of the flying capacitor $C_1$ is increased and the discharging time is decreased. Under this circumstance, the voltage value $V_{c1}$ of the flying capacitor $C_1$ is increased to approach the anticipated voltage value $V^*_{c1}$.

The step of forecasting the direction of the inductor current $I_L$ is updated after every adjusting period $T_d$ corresponding to the flying capacitor $C_1$ is ended. That is, the step of forecasting the direction of the inductor current $I_L$ is updated according to the result of the multiplication/division on the voltage difference value $V_d$ in the adjusting period, the average value or the cumulative value of the voltage error value $eV_1$ in the adjusting period and the current direction adjusting signal in the previous adjusting period. If voltage difference value $V_d$ is higher than zero ($V_d<0$), it means that the voltage value of the flying capacitor is increased in the previous adjusting period. Moreover, if the voltage value $V_{c1}$ of the flying capacitor $C_1$ is lower than the anticipated voltage value $V^*_{c1}$ ($eV_1>0$), it means that the direction of adjusting the voltage value of the flying capacitor $C_1$ is accurate. Consequently, it is confirmed that the direction of the inductor current $I_L$ and the current direction adjusting signal Sign in the previous adjusting period are identical. If $V_d<0$ and $eV_1<0$ in the previous adjusting period, it means that the direction of adjusting the voltage value of the flying capacitor $C_1$ is also accurate. Consequently, the current direction adjusting signal Sign in the previous adjusting period is also used in the next adjusting period. On the other hand, if the voltage difference value $V_d$ and the voltage error value $eV_1$ have different signs, it means that the direction of adjusting the voltage value of the flying capacitor $C_1$ is inaccurate. Consequently, it is confirmed that the direction of the inductor current $I_L$ and the current direction adjusting signal Sign in the previous adjusting period are opposite. Consequently, the opposite sign of the current direction adjusting signal Sign in the previous adjusting period is used in the next adjusting period.

The control method of the present invention has many benefits. Firstly, the purpose of detecting the current direction is achieved by measuring the voltage value of any flying capacitor. Especially, when the voltage difference is larger, the accuracy of detecting the current direction will be enhanced and the possibility of misjudging the current direction due to the measurement error will be minimized. The initial value of the current direction adjusting signal Sign is arbitrarily given. During the adjusting process, the misjudging condition possibly occurs in a short time. If the current direction adjusting signal and the direction of the inductor current are not identical, the voltage of the flying capacitor is erroneously adjusted. However, as long as the error only appears in the beginning or seldom occurs and the influence of every single adjusting action on the voltage of the flying capacitor is very small, the voltage error of the flying capacitor is still acceptable. Secondly, if the voltage error value between the voltage value of the flying capacitor and the anticipated voltage is small, the measurement error may also result in the inaccurate signs. However, since the voltage value of the flying capacitor is close to the anticipated voltage, the voltage error of the flying capacitor is acceptable. Thirdly, if the voltage difference value of the flying capacitor in an adjusting period is small, the measurement error may also result in the inaccurate signs and the inaccurate adjusting direction. However, after voltage difference value of the flying capacitor is continuously accumulated, a considerable voltage difference value of the flying capacitor is generated. The considerable voltage difference value of the flying capacitor can increase the accuracy of measuring the positive and negative signs. Moreover, when the adjusting period is increased, the considerable voltage difference value is obtained and thus the accuracy of measuring the sign is enhanced. In other words, the control method of the present invention has higher tolerance to the voltage error values.

From the above descriptions, the present invention provides a voltage balance control device and a voltage balance control method for a flying-capacitor multilevel converter. A current direction forecasting unit acquires a voltage change amount of any selected flying capacitor of the flying-capacitor multilevel converter, and receives a feedback signal of two adjacent switch elements corresponding to the selected flying capacitor. A computing result is generated according to an average value or a cumulative value of the feedback signal in the adjusting period. After the multiplication and/or division is performed on the voltage change amount and the computing result, the current direction can be forecasted according to the obtained sign. Consequently, the voltage balance of the flying capacitor of the flying-capacitor multilevel converter can be achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A voltage balance control device for a flying-capacitor multilevel converter, the flying-capacitor multilevel converter including plural flying capacitors, even-numbered switch elements and a filtering inductor, the even-furthered switch elements being serially connected between a positive electrode and a negative electrode of a DC voltage source, the filtering inductor being connected with a middle point of the serially-connected even-numbered switch elements, a first end of each flying capacitor being connected with two adjacent switching elements at a first side of the middle point, a second end of each flying capacitor being connected with two adjacent switching elements at a second side of the middle point, the even-numbered switch elements being operated at the same switching period, the voltage balance control device comprising:

a control signal processor generating plural control signals corresponding to the switch elements, thereby controlling on/off states of the switch elements;

a voltage/current detecting unit detecting voltage values of the plural flying capacitors to output a first detecting result, and detecting an operating status of the flying-capacitor multilevel converter to output a second detecting result;

a capacitor voltage balance controller receiving the first detecting result and generating plural first duty cycle differences according to a result of comparing the voltage values of the first detecting result with plural anticipated voltage values of the plural flying capacitors;

a current direction forecasting unit calculating a current direction adjusting signal in each adjusting period according to the voltage value of any selected flying capacitor from the first detecting result and a feedback signal, wherein the feedback signal is related to the duty cycle difference between the duty cycles of the two serially-connected switch elements corresponding to the selected flying capacitor, and the adjusting period is an integer multiple of the switching period; and a computing unit performing multiplication and/or division on the current direction adjusting signal and the plural first duty cycle differences, thereby generating corresponding second duty cycle differences, wherein the control signal processor generates the plural control signals according to a reference value, the second detecting result and the plural second duty cycle differences, wherein the voltage values of the plural flying capacitors are maintained at the corresponding anticipated voltage values according to the plural duty cycle signals.

2. The voltage balance control device according to claim 1, wherein the capacitor voltage balance controller comprises:

a voltage error generator generating voltage error values according to a result of comparing the voltage values of the flying capacitors of the first detecting result with the corresponding anticipated voltage values; and a voltage error transforming unit receiving the voltage error values and transforming the voltage error values into the plural first duty cycle differences.

3. The voltage balance control device according to claim 2, wherein the voltage error transforming unit is a digital PID controller or a hysteresis loop controller.

4. The voltage balance control device according to claim 1, wherein the control signal processor comprises:

an initial duly cycle signal generator receiving the second detecting result and generating an initial duty cycle signal according to a result of comparing the second detecting result with the reference value;

a duty cycle modification unit receiving the initial duty cycle signal and the plural second duty cycle differences and generating the plural duty cycle signals according to the initial duty cycle signal and the plural second duty cycle differences; and a pulse driving unit receiving the plural duty cycle signals and transforming the plural duty cycle signals into the plural control signals, thereby controlling on/off states of the switch elements.

5. The voltage balance control device according to claim 1, wherein the feedback signal is the duty cycle difference between the duty cycles of the two serially-connected switch elements corresponding to the selected flying capacitor.

6. The voltage balance control device according to claim 5, wherein the current direction forecasting unit comprises:

a voltage difference calculating unit generating a voltage difference value according to a result of comparing the voltage value of the selected flying capacitor in a present adjusting period with the voltage value of the selected flying capacitor in a previous adjusting period;

a duty cycle difference calculating unit calculating a third duty cycle difference between the duty cycles of the two serially-connected switch elements corresponding to the selected flying capacitor in every switching period, and generating a first computing result according to an average value or a cumulative value of the third duty cycle difference of all switching periods in the adjusting period; and a sign calculating unit performing multiplication and/or division on the voltage difference value and the first computing result to obtain a second computing result, wherein the current direction adjusting signal is determined according to a sign of the second computing result.

7. The voltage balance control device according to claim 1, wherein the feedback signal is the first duty cycle difference corresponding to the selected flying capacitor.

8. The voltage balance control device according to claim 7, wherein the current direction forecasting unit comprises:

a voltage difference calculating unit generating a voltage difference value according to a result of comparing the voltage value of the selected flying capacitor in a present adjusting period with the voltage value of the selected flying capacitor in a previous adjusting period;

a duty cycle calculating unit receiving the first duty cycle difference corresponding to the selected flying capacitor, and generating a third computing result according to an average value or a cumulative value of the first duty cycle difference of all switching periods in the adjusting period; and a sign calculating unit performing multiplication and/or division on the voltage difference value, the third computing result and the current direction adjusting signal in the previous adjusting period so as to obtain a fourth computing result, wherein the current direction adjusting signal is determined according to a sign of the fourth computing result.

9. The voltage balance control device according to claim 2, wherein the feedback signal is the voltage error value corresponding to the selected flying capacitor.

10. The voltage balance control device according to claim 9, wherein the voltage error generator is a proportional regulator.

11. The voltage balance control device according to claim 10, wherein the current direction forecasting unit comprises:

a voltage difference calculating unit generating a voltage difference value according to a result of comparing the voltage value of the selected flying capacitor in a present adjusting period with the voltage value of the selected flying capacitor in a previous adjusting period;

a voltage error calculating unit receiving the voltage error value corresponding to the selected flying capacitor, and generating a fifth computing result according to an average value or a cumulative value of the voltage error value of all switching periods in the adjusting period; and a sign calculating unit performing multiplication and/or division on the voltage difference value, the fifth computing result and the current direction adjusting signal in the previous adjusting period so as to obtain a sixth computing result, wherein the current direction adjusting signal is determined according to a sign of the sixth computing result.

12. A voltage balance control method fir a flying-capacitor multilevel converter, the flying-capacitor multilevel converter including plural flying capacitors, even-numbered switch elements and a filtering inductor, the even-numbered switch elements being serially connected between a positive electrode and a negative electrode of a DC voltage source, the filtering inductor being connected with a middle point of the serially-connected even-numbered switch elements, a first end of each flying capacitor being connected with two adjacent switching elements at a first side of the middle point, a second end of each flying capacitor being connected with two adjacent switching elements at a second side of the middle point, the even-numbered switch elements being operated at the same switching period, the voltage balance control method comprising steps of:
(a) generating plural control signals corresponding to the switch elements, thereby controlling on/off states of the switch elements;
(b) detecting voltage values of the plural flying capacitors to output a first detecting result, and detecting an operating status of the flying-capacitor multilevel converter to output a second detecting result;
(c) generating plural first duty cycle differences according to a result of comparing the voltage values of the first detecting result with plural anticipated voltage values of the plural flying capacitors;
(d) calculating a current direction adjusting signal in each adjusting period according to the voltage value of any selected flying capacitor from the first detecting result and a feedback signal, wherein the feedback signal is related to the duty cycle difference between the duty cycles of the two serially-connected switch elements corresponding to the selected flying capacitor, and the adjusting period is an integer multiple of the switching period; and
(e) performing multiplication and/or division on the current direction adjusting signal and the plural first duty cycle differences, thereby generating corresponding second duty cycle differences; and
(f) generating the plural control signals according to a reference value, the second detecting result and the plural second duty cycle differences, wherein the voltage values of the plural flying capacitors are maintained at the corresponding anticipated voltage values according to the plural duty cycle signals.

13. The voltage balance control method according to claim 12, wherein the feedback signal is the duty cycle difference between the duty cycles of the two serially-connected switch elements corresponding to the selected flying capacitor.

14. The voltage balance control method according to claim 13, wherein the step (d) further comprises sub-steps of:
(d1) generating a voltage difference value according to a result of comparing the voltage value of the selected flying capacitor in a present adjusting period with the voltage value of the selected flying capacitor in a previous adjusting period;
(d2) calculating a third duty cycle difference between the duty cycles of the two serially-connected switch elements corresponding to the selected flying capacitor in every switching period, and generating a first computing result according to an average value or a cumulative value of the third duty cycle difference of all switching periods in the adjusting period; and
(d3) performing multiplication and/or division on the voltage difference value and the first computing result to obtain a second computing result, wherein the current direction adjusting signal is determined according to a sign of the second computing result.

15. The voltage balance control method according to claim 12, wherein the feedback signal is the first duty cycle difference corresponding to the selected flying capacitor.

16. The voltage balance control method according to claim 15, wherein the step (d) further comprises sub-steps of:
(d1) generating a voltage difference value according to a result of comparing the voltage value of the selected flying capacitor in a present adjusting period with the voltage value of the selected flying capacitor in a previous adjusting period;
(d2) generating a third computing result according to an average value or a cumulative value of the first duty cycle difference of all switching periods in the adjusting period; and
(d3) performing multiplication and/or division on the voltage difference value, the third computing result and the current direction adjusting signal in the previous adjusting period so as to obtain a fourth computing result, wherein the current direction adjusting signal is determined according to a sign of the fourth computing result.

17. The voltage balance control method according to claim 12, wherein the step (c) further comprises steps of:
(c1) generating voltage error values according to a result of comparing the voltage values of the flying capacitors of the first detecting result with the corresponding anticipated voltage values; and
(c2) transforming the voltage error values into the plural first duty cycle differences.

18. The voltage balance control method according to claim 17, wherein the feedback signal is the voltage error value corresponding to the selected flying capacitor.

19. The voltage balance control method according to claim 18, wherein the step (d) further comprises sub-steps of:
(d1) generating a voltage difference value according to a result of comparing the voltage value of the selected flying capacitor in a present adjusting period with the voltage value of the selected flying capacitor in a previous adjusting period;
(d2) generating a fifth computing result according to an average value or a cumulative value of the voltage error value of all switching periods in the adjusting period; and
(d3) performing multiplication and/or division on the voltage difference value, the fifth computing result and the current direction adjusting signal in the previous adjusting period so as to obtain a sixth computing result, wherein the current direction adjusting signal is determined according to a sign of the sixth computing result.

20. The voltage balance control method according to claim 12, wherein the step (f) further comprises steps of:
(f1) generating an initial duty cycle signal according to a result of comparing the second detecting result with the reference value;

(f2) modifying the plural duty cycle signals according to a the initial duty cycle signal and the plural second duty cycle differences; and (f3) transforming the modified plural duty cycle signals into the plural control signals, thereby controlling on/off states of the switch elements.

* * * * *